Figure 1:
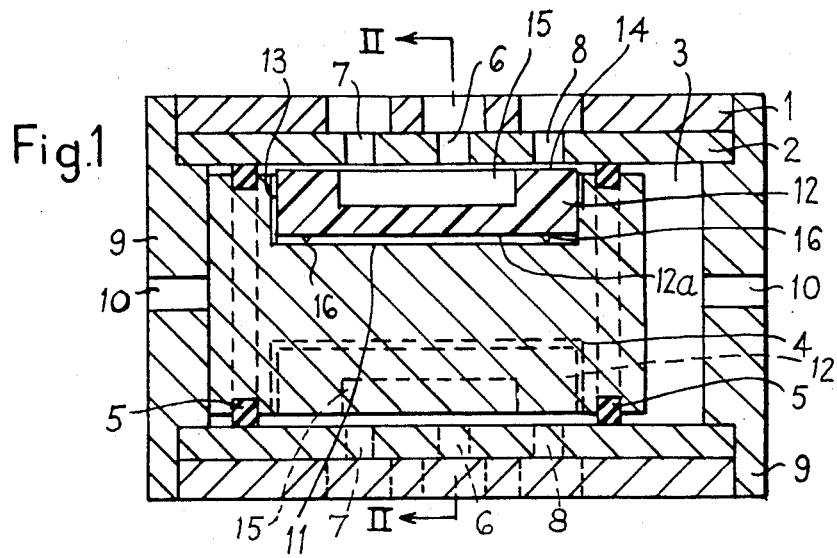

United States Patent [19]

Brisland

[11] Patent Number: 4,683,914
[45] Date of Patent: Aug. 4, 1987

[54] SLIDE VALVE

[76] Inventor: Michael J. Brisland, 12, Windermere Road, Peniston, South Yorkshire, England, S30 6HL

[21] Appl. No.: 877,702

[22] PCT Filed: Oct. 4, 1984

[86] PCT No.: PCT/GB84/00338
§ 371 Date: Jun. 6, 1985
§ 102(e) Date: Jun. 6, 1985

[87] PCT Pub. No.: WO85/01558
PCT Pub. Date: Apr. 11, 1985

Related U.S. Application Data

[63] Continuation of Ser. No. 757,288, Jun. 6, 1985, abandoned.

[30] Foreign Application Priority Data

Oct. 6, 1983 [GB] United Kingdom ............... 8326702

[51] Int. Cl.⁴ ............................................. F15B 13/02
[52] U.S. Cl. ........................ 137/625.48; 137/625.25; 137/625.66
[58] Field of Search ................ 137/625.25, 625.48, 137/625.66; 251/175

[56] References Cited

U.S. PATENT DOCUMENTS

| | | | |
|---|---|---|---|
| 3,227,180 | 1/1966 | Tissot-Dupont | 137/625.66 |
| 3,610,285 | 10/1971 | Passaggio | 137/625.66 |

FOREIGN PATENT DOCUMENTS

| | | | |
|---|---|---|---|
| 1150454 | 1/1958 | France | 137/625.66 |
| 2283372 | 3/1976 | France | 137/628.48 |
| 426409 | 6/1967 | Switzerland | 137/628.66 |
| 1116872 | 6/1968 | United Kingdom . | |
| 1125127 | 8/1968 | United Kingdom . | |
| 1273762 | 5/1972 | United Kingdom . | |
| 1496063 | 12/1977 | United Kingdom . | |

Primary Examiner—Gerald A. Michalsky
Attorney, Agent, or Firm—Biebel, French & Nauman

[57] ABSTRACT

A slide valve comprises a valve body having valve ports and a slide mounted within and slidable relative to the valve body for controlling the opening, interconnection and closing of the valve ports. The slide carries a valve block forming a sealing member which is floatingly located in a recess in the slide and which includes one or more galleries to provide interconnection between two or more of the ports in one or more defined positions of the slide. The sealing member also has at least one sealing surface for sealing off one or more of the ports in one or more defined positions of the slide. The sealing member is urged into its sealing position solely by means of fluid pressure applied through at least one of the ports.

9 Claims, 7 Drawing Figures

SLIDE VALVE

This application is a continuation of Ser. No. 757,288, filed June 6, 1985, now abandoned.

This invention relates to slide valves and more particularly to slide valves which control the passage of a fluid, which may be either a gas or a liquid.

Slide valves, which are also known as spool valves, commonly comprise a cylinder in which a spool or piston is free to move relative to apertures or ports formed in the cylinder wall so as to provide passages for a fluid or cut off a supply of fluid. The spool or piston is formed with one or more annular grooves which are wide enough to allow the passage of fluid between two laterally spaced ports in the cylinder. To either side of each annular groove and set into the major diameter of the spool or piston are sealing elements such as "O" seals which define a pressure tight region between them. Typically, a common inlet port is connected to a laterally offset outlet port by an annular groove formed in the spool. By moving the spool laterally, the outlet port will be closed to the passage of fluid by the sealing element being interposed between the inlet and outlet port. The corresponding sealing element may, in this position, expose a second port to the annular groove and allow the passage of fluid through the second port.

However, slide valves of this nature have poor endurance characteristics because the sealing elements mounted on the spool or piston are subjected to wear each time they pass a port in the cylinder. Moreover the sealing action of the spool or piston is not positive in that the flow of fluid is first restricted by the major diameter of the spool passing a port and then finally terminated by the seal element passing that port.

Other known spool valves consists of a precision-ground spool or piston arranged to slide in a finely machined and honed cylindrical bore with a minimum clearance between the parts in order to minimise leakage. The construction of such a valve is however expensive due to the accurate machining and close tolerances required. Moreover, because of the metal-to-metal sliding contact as the valve operates, the valve is subject to wear and also requires lubrication.

A desired operational requirement in spool valves is that the spool action should be free from inertia to enable consistent response to pilot signals.

The first described example of a known spool valve has high friction characteristics due to the number of sealing elements incorporated in the spool rubbing on the bore of the cylinder. This results in hysterisis in response to pilot signals.

In the second described example of a known spool valve, the sealing elements are eliminated and friction is confined to the contacting surfaces of the spool and cylinder bore. Hysterisis in this case is relative to wear and lubrication characteristics of the valve.

It is an object of the present invention to provide an improved construction of slide valve which alleviates the disadvantages of known construction.

From one aspect the invention provides a slide valve for controlling the passage of a fluid comprising a valve body having valve ports and a slide slidable relative to the valve body for controlling the opening, interconnection and closing of the valve ports, wherein the slide carries a sealing member for sealing off one or more of the valve ports, said sealing member being floatingly located in the slide and being urged into its sealing position by means of fluid pressure applied through at least one of the ports.

From another aspect the invention provides a slide valve comprising a valve body having valve ports and a slide mounted within and slidable relative to the valve body for controlling the opening, interconnection and closing of the valve ports, wherein the slide carries a sealing member which is floatingly located in a location in said slide, said sealing member including one or more galleries to provide interconnection between two or more ports in one or more defined positions of the slide and said sealing member having at least one sealing surface for sealing off one or more of the ports in one or more defined positions of the slide, said sealing member being urged into its sealing position by means of fluid pressure applied through at least one of said ports.

Figure 3:
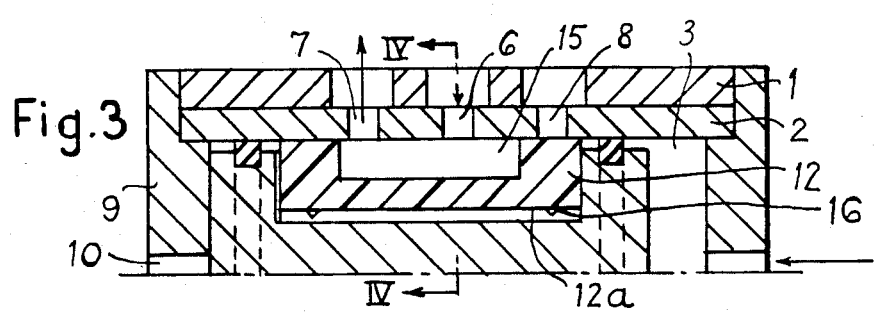
Figure 5:
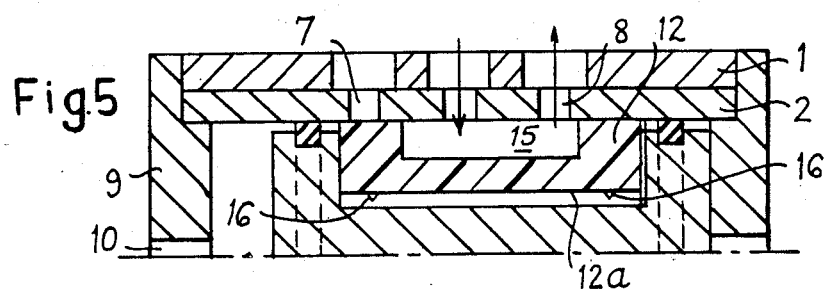
Figure 2:
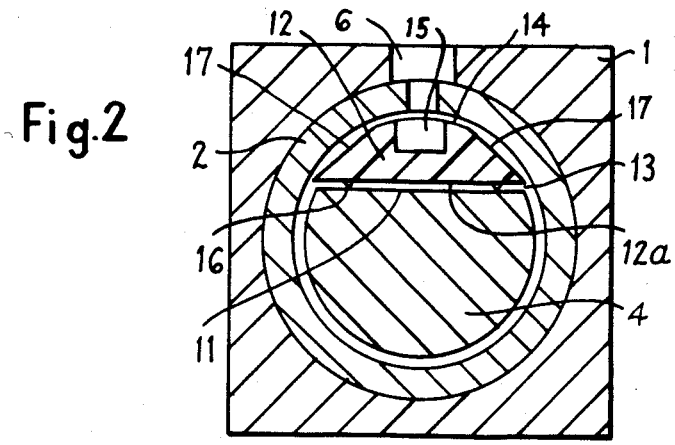
Figure 4:
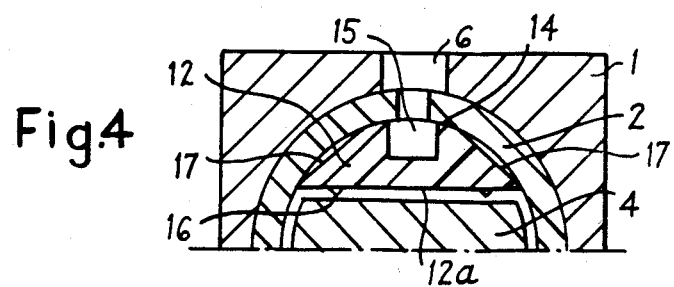
Figure 6A:
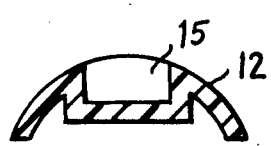
Figure 6B:
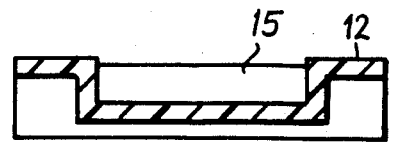

The invention will now be further described, by way of example, with reference to the accompanying drawings, in which:

FIG. 1 is a longitudinal cross-section of one embodiment of slide valve according to the present invention, FIG. 2 is a cross-section on the line II—II in FIG. 1, FIG. 3 is a partial view similar to FIG. 1 but showing the valve when energised in one position, FIG. 4 is a partial cross-section on the line IV—IV in FIG. 3, FIG. 5 is a partial cross-section similar to FIG. 3 but showing the valve when energised and switched to another position, and FIGS. 6a and 6b are respectively a cross-section and longitudinal section of an alternative form of sealing member.

In the drawings, the same reference numerals are used for corresponding parts in the various Figures.

Referring to FIGS. 1 to 5, the slide valve comprises a valve body in the form of a metal block 1 within which is disposed a cylindrical cylinder liner 2 defining a cylindrical cavity or pore 3. A cylindrical spool or piston 4 is slidably located in the bore 3 and is provided with an annular sealing ring 5 adjacent each of its ends. A centrally disposed inlet port 6 and two outlet ports 7,8, one at either side of the inlet port, are provided extending through the valve body and cylinder liner. The diameter of the spool 4 is smaller than the cylindrical bore 3 in order to provide a clearance so that fluid pressure can act over the complete surface of the spool. The seals 5 at either end of the spool provide a pressure tight region between them and are of a double-acting type which allows the spool 4 to be activated by pressure signals applied at either end of the device. To this end the valve body 1 is closed at each end by a valve cap 9 containing an aperture 10 through which a positive or negative pressure control signal may be applied to control the position of the spool.

The spool 4 is provided to one side with a flat recess 11 in which is located a valve block 12 of a low friction plastics material in a floating fashion. Thus, the valve block is not attached in any way and a clearance 13 is provided between it and the adjacent walls of the recess 11. This clearance has been somewhat exaggerated in the drawings for the sake of clarity. A portion 14 of the outer surface of the valve block 12 is curved to conform to the adjacent wall of the cylinder liner 2, so that when it is in contact with the cylinder wall it forms a sealing member and proivdes a fluid-tight seal in the region of the ports 6,7 and 8. This region of the outer surface of the valve block is provided with a longitudinally extending gallery 15 in order to provide selective interconnection between the central port 6 and either of the two outlet ports 7 and 8 according to the position of the spool 4. The inner or rear face 12a of the valve block 12 may be provided with small pips or protrusions 16, as shown, in order to maintain the clearance between it and the adjacent face of the spool.

The valve body 1, cylinder liner 2 and spool or piston 4 are made of metal, the annular seals 5 are made of a low friction rubber like material and the valve block 12 is made of a low friction plastics material and may be formed by injection moulding.

As mentioned above, in this embodiment the central port 6 is intended to be the inlet port and either of the two outer ports 7 and 8 are intended to be outlet ports. The holes in the valve body 1 may be threaded in order to allow suitable fluid connections to be attached to the valve.

The operation of the slide valve will now be described. FIGS. 1 and 2 show the valve in one of its positions when no fluid is entering the valve and no actuating signals are applied to it. In this position, the valve block 12 is spaced away from the wall of the cylinder liner 2 so that a fluid entering by the inlet port 6 will be able to pass over the surface of the spool 4 and fill the space defined by the seals 5 between the spool and the cylinder liner 2. The annular seals 5 on the spool prevent the fluid escaping from this enclosed space which they define. It will be apparent that the rear face 12a of the valve block is also exposed to this fluid pressure. However, the two outlet ports 7 and 8 provide leakage passages for the fluid and thus create depression zones at the face 14 of the valve block which in turn creates an inbalance of pressure forces acting on the valve block and causes it to move towards the lower pressure regions and thus assume the position shown in FIGS. 3 and 4. In this position, the plan area of the rear face 12a of the valve block is exposed to pressure and those regions 17 of the outer surface flanking the curved surface 14 are also exposed to pressure. Thus, as will be clearly apparent, since the pressure acting on the rear face 12a of the valve block to push it against the cylinder wall is greater than the pressure acting on the front face of the valve block, it will be positively urged against the cylinder wall as seen in FIGS. 3 and 4. In this way the valve block 12 acts as a seal to prevent leakage of pressure around the block. In the position shown, the gallery 15 interconnects ports 6 and 7 whilst port 8 is closed off by the face 14 of valve block 12.

FIG. 5 shows a similar view to FIG. 2 but with the valve switched to the other position by means of a fluid pressure control signal applied to the appropriate one of the inlets 10. In this position ports 6 and 8 are connected whilst port 7 is closed off.

An important feature of the valves according to the present invention is that although they rely on unbalanced forces acting on the valve, as opposed to conventional spool valves which are balanced, the unbalanced forces acting on the valve are arranged to be relatively insignificant at working fluid pressures. Thus the unbalanced forces are restricted to the valve block 12 because the spool 4 is exposed to pressure over its entire surface and is therefore balanced.

The unbalanced forces acting on valve block 12 are necessary to enable the valve to function and thefore cannot be eliminated. However these unbalanced forces can be minimised by reducing the difference in areas which are exposed to pressure forces on either side of the valve block. The unbalanced forces acting upon the valve block may be increased or reduced by adjusting the relative areas on which the opposing pressure forces act on either side of the valve block.

The valves according to the present invention do not require any close-tolerance components other than possibly the cylinder liner 2 which has to conform with the valve block 1. Any wear either occurring between the cylinder wall of the liner 2 and on the valve block 12 is an advantage as it improves the conformity value of the two components. Moreover, the valve can operate either with or without lubrication dependent upon the type of material used for the moulding of the value block and the nature of the fluid being controlled.

FIGS. 6a and 6b show an alternative form of valve block moulded from a plastics material, which has a substantially uniform wall section throughout rather than being of a more generally solid form as in the embodiment of FIGS. 1 to 5.

Whilst particular embodiments have been described it will be understood that various modifications may be made without departing from the scope of this invention. Thus, other arrangements of the inlet and outlet ports are clearly possible and valve block may incorporate more than one gallery for interconnecting the ports. Moreover, if desired, the spool or piston may incorporate two or more valve blocks spaced around its periphery, for example two diametrically opposite valve blocks, each controlling its own set of inlet and outlet ports as indicated in dashed lines in FIG. 1. It will also be clearly apparent that the valve may be switched by other than a fluid pressure or electrical control signal.

The valves according to the present invention may be employed in a fluid motor as disclosed in my copending U.K. Application No. 8133005.

I claim:

1. A slide valve comprising:
a valve body having a plurality of valve ports therethrough, at least one of which is an inlet port;
a slide slidably mounted within said valve body to at least two defined positions for controlling opening, interconnection, and closing of said valve ports, said slide including a recess thereon; and
a valve block floatingly located within said recess and sized to provide a clearance therewith sufficient to permit fluid flow so that the rear face of the valve block is exposed to fluid pressure applied through said inlet port, said valve block including a gallery communicating with and being shaped to provide interconnection between said inlet port and at least one other of said valve ports, and at least one sealing surface for sealing off at least one of said other valve ports in at least one of said defined positions of said slide, in which said defined position said valve block is moved solely by the pressure applied through said inlet port to its rear face such that said sealing surface is urged against and closes said at least one of said other valve ports.

2. A slide valve as claimed in claim 1, wherein the valve body comprises a cylinder wall forming a cylindrical cavity, the slide includes a spool slidably located in the cavity and including a recess, and in which the ports are formed through the cylinder wall.

3. A slide valve as claimed in claim 2, wherein an annular seal is provided between the spool and the cylinder wall to either side of the valve block.

4. A slide valve as claimed in claim 2, wherein the cylinder wall includes a cylinder liner forming the cylindrical cavity and is located within the valve body.

5. A slide valve as claimed in claim 2, wherein means are provided to space the rear face of the valve block from an adjacent surface of said recess.

6. A slide valve as claimed in claim 2, wherein closures are provided at either end of the cylindrical cavity through which an operating medium may be applied to control the position of the slide.

7. A slide valve as claimed in claim 2, wherein the spool is virtually subjected to only balanced pressure forces and the unbalanced pressure forces are present virtually only on the valve block.

8. A slide valve as claimed in claim 2, wherein the wall defining the cylindrical cavity comprises at least two sets of ports and the spool comprises a corresponding number of valve blocks, one for each set of ports.

9. A slide valve as claimed in claim 1, wherein the valve block is molded from a plastics material.

* * * * *